(12) United States Patent
Frank

(10) Patent No.: US 11,046,211 B2
(45) Date of Patent: Jun. 29, 2021

(54) SPRING ASSEMBLY FOR AN UNLOCKING MECHANISM FOR A LONGITUDINAL ADJUSTMENT SYSTEM FOR A VEHICLE SEAT AND METHOD FOR INSTALLING A SPRING ASSEMBLY

(71) Applicant: Adient Luxembourg Holding S.à r.l., Luxembourg (LU)

(72) Inventor: Paul Frank, Cologne (DE)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 122 days.

(21) Appl. No.: 16/319,915

(22) PCT Filed: Jul. 21, 2017

(86) PCT No.: PCT/EP2017/068458
§ 371 (c)(1),
(2) Date: Jan. 23, 2019

(87) PCT Pub. No.: WO2018/019712
PCT Pub. Date: Feb. 1, 2018

(65) Prior Publication Data
US 2019/0270394 A1 Sep. 5, 2019

(30) Foreign Application Priority Data
Jul. 25, 2016 (DE) ...................... 10 2016 213 615.1
Oct. 12, 2016 (DE) ...................... 10 2016 219 886.6

(51) Int. Cl.
*B60N 2/08* (2006.01)
*F16F 1/00* (2006.01)

(52) U.S. Cl.
CPC ......... *B60N 2/0875* (2013.01); *B60N 2/0806* (2013.01); *B60N 2/0818* (2013.01); *B60N 2/0843* (2013.01); *B60N 2/0881* (2013.01)

(58) Field of Classification Search
CPC .......... F16F 1/12; F16F 1/121; B60N 2/0875; B60N 2/0806; B60N 2/0843; B60N 2/0881; B60N 2/0818
See application file for complete search history.

(56) References Cited

U.S. PATENT DOCUMENTS 4,742,983 A * 5/1988 Nihei ...................... B60N 2/123
248/419
5,028,028 A * 7/1991 Yamada ................. B60N 2/071
248/430

(Continued)

FOREIGN PATENT DOCUMENTS

DE 10 2011 083 121 A1 4/2012
EP 1 384 618 A1 1/2004

(Continued)

*Primary Examiner* — Melody M Burch
(74) *Attorney, Agent, or Firm* — Marshall & Melhorn, LLC

(57) ABSTRACT

A spring assembly (1) is provided for an unlocking mechanism for a longitudinal adjustment system for a vehicle seat. The spring assembly (1) includes a clip wire (2), a spring guide (3) and a leg spring (4). In an installed state, the spring guide (3) can be disposed or is disposed in an axially movable but not rotatable manner on a straight first clip section (2.1) of the clip wire (2). The spring guide (3) can be brought or is brought into an operating state, in which it is rotatable with respect to the first clip section (2.1), via an axial movement on the first clip section (2.1). A method is further provided for installing a spring assembly (1) in an unlocking mechanism for a longitudinal adjustment system for a vehicle seat.

9 Claims, 11 Drawing Sheets

(56) References Cited

U.S. PATENT DOCUMENTS

| | | | | |
|---|---|---|---|---|
| 5,358,207 A * | 10/1994 | West | ............ | B60N 2/0705 |
| | | | | 248/430 |
| 5,971,342 A * | 10/1999 | Sakai | ............ | B60N 2/0705 |
| | | | | 248/429 |
| 6,981,681 B2 | 1/2006 | Matsumoto | | |
| 2015/0107403 A1 * | 4/2015 | Flick | ............ | B60N 2/0843 |
| | | | | 74/532 |

FOREIGN PATENT DOCUMENTS

| | | | |
|---|---|---|---|
| GB | 2 317 558 A | 4/1998 | |
| KR | 2013 0072007 A | 7/2013 | |
| WO | 2009/132944 A1 | 11/2009 | |

* cited by examiner

SPRING ASSEMBLY FOR AN UNLOCKING MECHANISM FOR A LONGITUDINAL ADJUSTMENT SYSTEM FOR A VEHICLE SEAT AND METHOD FOR INSTALLING A SPRING ASSEMBLY

CROSS REFERENCE TO RELATED APPLICATIONS

This application is a United States National Phase Application of International Application PCT/EP2017/068458, filed Jul. 21, 2017, and claims the benefit of priority under 35 U.S.C. § 119 of German Applications 10 2016 213 615.1, filed Jul. 25, 2016 and 10 2016 219 886.6, filed Oct. 12, 2016, the entire contents of which are incorporated herein by reference.

TECHNICAL FIELD

The invention relates to a spring assembly for an unlocking mechanism for a longitudinal adjustment system for a vehicle seat and a method for installing such a spring assembly.

BACKGROUND

Such spring assemblies which are arranged on an upper rail of a longitudinal adjustment system for a vehicle seat are known in the prior art. Moreover, methods for installing such spring assemblies are known in the prior art.

SUMMARY OF THE INVENTION

It is an object of the present invention to provide an improved spring assembly for an unlocking mechanism, in particular for an unlocking mechanism for a longitudinal adjustment system for a vehicle seat. It is also the object of the invention to provide an improved method for installing a spring assembly for an unlocking mechanism for a longitudinal adjustment system for a vehicle seat.

A spring assembly serves as an unlocking mechanism for a vehicle seat, in particular as an unlocking mechanism for a longitudinal adjustment system for a vehicle seat. According to the invention, the spring assembly has a clip wire, a spring guide and a leg spring, wherein in an installation state the spring guide is arrangeable or is arranged in an axially displaceable but non-rotatable manner on a straight first clip section of the clip wire and wherein the spring guide is movable or is moved into an operating state in which it is rotatable with respect to the first clip section, via an axial displacement on the first clip section.

The spring assembly is movable from a pretensioned installation state into an operating state which is at least partially untensioned relative to the installation state and in which the first clip section is axially displaced relative to the spring guide. As a result, the spring assembly is initially untensioned, i.e. connectable with an unlocking lever in a particularly simple manner. Subsequently the clip wire is axially displaced in the spring guide. As a result, the spring is released and transfers its spring force from below against the unlocking lever.

The advantages achieved by the invention are, in particular, that an installation of the spring assembly with a leg spring is simplified. The activation of the leg spring in the fitted state of the spring assembly is possible in a particularly simple manner. As a result, an unlocking mechanism for a longitudinal adjustment system for a vehicle seat is structurally simple, in particular producible with reduced personal effort.

The spring assembly according to the invention permits a highly simplified installation method since the spring assembly is initially untensioned in its installation state, i.e. fittable in a particularly simple manner in an unlocking mechanism for a longitudinal adjustment system for a vehicle seat, in particular connectable with an unlocking lever. By the axial displacement of the clip wire which may be undertaken in a simple manner in the spring guide, the spring is releasable in a simple manner so that the spring force thereof is transferable in a simple manner from below against the unlocking lever, without the spring having to be additionally suspended on the seat rail, as is required in the prior art.

Preferably, in this case the spring guide is configured in one piece. As a result, the spring assembly is producible in a very simple manner.

Particularly preferably, in this case the spring guide comprises a sleeve and an eccentric plate. An embodiment of the spring assembly provides that the eccentric plate comprises a first cam and a second cam as well as an arcuate portion arranged between the cams. As a result, the function of the spring assembly is achievable in a manner which is structurally particularly simple and cost-effective.

A further embodiment of the spring assembly provides that the clip wire has a second clip section which extends substantially parallel to the straight first clip section and which comprises a bulged portion which is aligned relative to the first clip section. As a result, the function of the spring assembly is achievable in a manner which is structurally particularly simple and cost-effective.

In this case, the spring guide is preferably configured as a spring mandrel, wherein the spring assembly is tensioned in the installation position and a spring force is releasable only after the first clip section is displaced relative to the spring guide, wherein during this release the spring guide is rotatable on the first clip section.

As a result, the spring guide undertakes two further functions: by the structural design of the spring guide, it is possible for the spring assembly to remain tensioned in an installation position and a spring force to be released only after displacement of the clip wire.

By means of this release, the spring guide and the clip wire move in opposing directions. In this case, on the one hand, the clip wire is supported against the unlocking lever and, on the other hand, a second cam of the eccentric plate is supported against a lateral wall of an upper seat rail. As a result, an additional suspension of the spring on the seat rail is superfluous.

A further embodiment of the spring assembly provides that in the installation state the spring guide together with the clip wire and the leg spring produces a pretensioning, wherein a first end of the leg spring presses against a region of the second clip section on the angled-back side, wherein a second end of the leg spring is fixed in the eccentric plate, for example by being inserted therein in the longitudinal direction, and wherein the bulged portion presses against the first cam and as a result is prevented from moving, in particular prevented from moving upwardly.

A further embodiment of the spring subassembly provides that in the operating state, after the axial displacement of the clip wire in the spring guide, the first cam is arranged adjacent to the bulged portion, that the second clip section is applied by a spring force against the lower face of an unlocking lever and that the second cam also bears against an outer wall of an upper seat rail and is pressed with a spring force thereagainst. As a result, an additional suspension of the spring on the seat rail is superfluous.

As a result, the spring assembly is movable in a simple manner from a pretensioned installation state into an operating state which is at least partially untensioned relative to the installation state and in which the first clip section is axially displaced relative to the spring guide. As a result, the spring assembly is initially untensioned, i.e. connectable with an unlocking lever in a particularly simple manner. Subsequently, the clip wire is axially displaced in the spring guide. As a result, the spring is released and transfers its spring force from below against the unlocking lever.

A method relates to the installation of a spring assembly according to the invention in an unlocking mechanism for a vehicle seat, in particular in an unlocking mechanism for a longitudinal adjustment system for a vehicle seat. According to the invention, the spring assembly which is tensioned in the installation state is moved on an upper seat rail below an unlocking lever, wherein the spring guide is moved by the leg spring into a final position in which the second cam bears against an outer wall of the upper seat rail. Subsequently, the clip wire is axially displaced in the spring guide so that the second clip section bears by spring force against the lower face of the unlocking lever.

As a result, the installation method is highly simplified since the spring assembly is initially untensioned, i.e. connectable with an unlocking lever in a particularly simple manner. By the axial displacement of the clip wire in the spring guide which may be easily undertaken, the spring is released and transfers its spring force from below against the unlocking lever without the spring having to be additionally suspended on the seat rail, as is necessary in the prior art.

In particular, the clip section is used at the same time as a pivot pin for the unlocking lever when the installation is complete and subsequently in the operating state. As a result, a structurally simple configuration of the unlocking mechanism is achievable with simple means.

An embodiment of the method provides that the clip hook is brought into operative connection with the unlocking lever, so that in the operating state the spring assembly is prevented from being pulled out. As a result, a separate fixing of the spring assembly is superfluous.

A further embodiment of the method provides that the first end of the leg spring acts against the second clip section and the second end of the leg spring is suspended in the bore of the eccentric plate, wherein the spring guide is initially blocked against rotation by the contact of the second cam with the bulged portion, and wherein subsequently a spring force of the spring guide is released by axial displacement of the spring guide, wherein subsequently the spring guide is supported on the wall of the upper seat rail and the second clip section is supported on the unlocking lever. As a result, a separate suspension of the leg spring is not required.

A further embodiment of the method provides that the spring guide is initially prevented from being inadvertently axially displaced by means of a notch arranged on the bulged portion. As a result, transport securing means are possible in a simple manner. Only by means of a defined additional expenditure of force are these transport securing means overcome during installation.

Exemplary embodiments of the invention are described in more detail with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
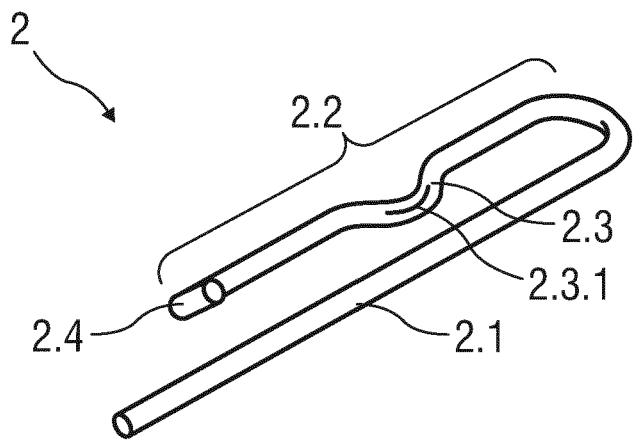
FIG. 1 is a perspective view showing a clip wire for a first embodiment of a spring assembly.

Referring to the drawings, parts which correspond to one another are provided with the same reference numerals in all of the figures.

FIG. 1 shows in a perspective view a clip wire 2 intended for a first embodiment of a spring assembly 1, not shown here. The clip wire 2 has a straight first clip section 2.1 and a second clip section 2.2 which preferably extends substantially parallel thereto. A bulged portion 2.3 which is oriented toward the first clip section 2.1 is located approximately in the center of the second clip section 2.2. A notch 2.3.1 is arranged on the bulged portion 2.3, said notch serving as transport securing means of the spring assembly before the installation thereof and optionally or additionally securing the spring assembly against inadvertent activation during installation. A clip hook 2.4 is arranged at the end of the second clip section 2.2. For example, the angle between the clip hook 2.4 and the second clip section 2.2 is approximately 70° to 90°.

Figure 2:
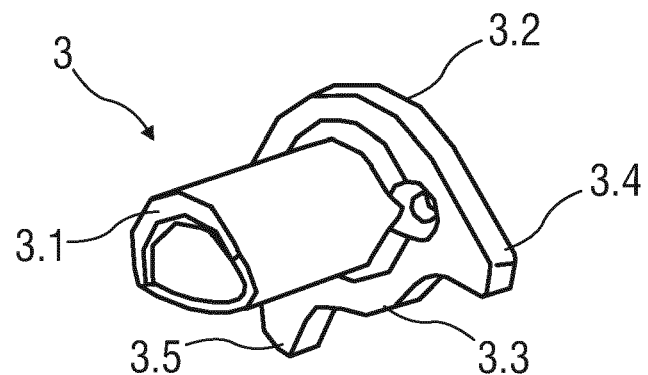
FIG. 2 is a perspective view showing a spring guide for the first embodiment of the spring assembly.

FIG. 2 shows in a perspective view a spring guide 3 intended for the first embodiment of the spring assembly 1, not shown here. The spring guide 3 is in one piece and comprises a sleeve 3.1 and an eccentric plate 3.2 arranged thereon. The eccentric plate 3.2 comprises an arcuate portion 3.3 and a first cam 3.4 and a second cam 3.5. The arcuate portion 3.3 is located between the cams 3.4, 3.5. Two bores are arranged on the eccentric plate 3.2.

Figure 3:
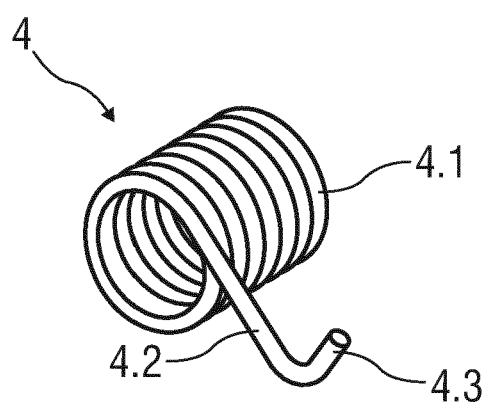
FIG. 3 is a perspective view showing a leg spring for the first embodiment of the spring assembly.

FIG. 3 shows in a perspective view a leg spring 4 intended for the first embodiment of the spring assembly 1, not shown here. The leg spring 4 is a torsion spring and comprises a plurality of helical windings 4.1, a first end 4.2 with a hook 4.3 and a second end 4.4 shown in FIG. 5.

Figure 4:
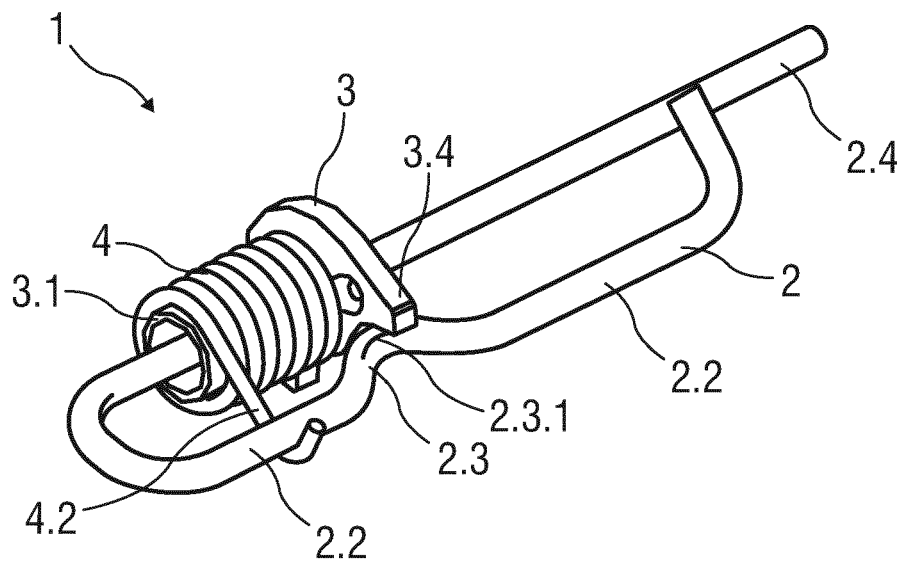
FIG. 4 is a first perspective view showing the first embodiment of the spring assembly in the pretensioned installation state.
Figure 5:
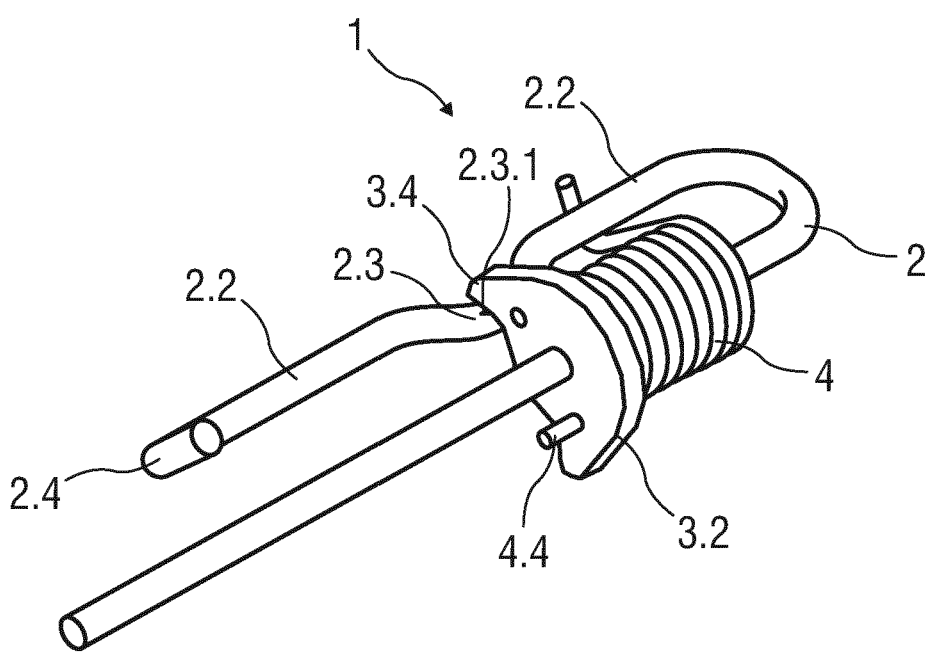
FIG. 5 is a second perspective view showing the first embodiment of the spring assembly in the pretensioned installation state.

FIG. 4 and FIG. 5 show in each case in a perspective view the first embodiment of the spring assembly 1 in a pretensioned installation state. The spring assembly 1 comprises the clip wire 2, the spring guide 3 and the leg spring 4. The sleeve 3.1 of the spring guide 3 is positioned on the first clip section 2.1 of the clip wire 2. As a result, the spring guide 3 is axially displaceable relative to the first clip section 2.1 and vice-versa. The spring guide 3 is, however, not rotatable relative to the first clip section 2.1 about the longitudinal axis thereof.

The clip hook 2.4 arranged at the end of the second clip section 2.2 is arranged at an oblique angle relative to the first clip section 2.1.

Optionally, the inner face of the sleeve 3.1 and the outer wall of the first clip section 2.1 preferably may have a number of longitudinally extending grooves and/or a number of corresponding longitudinally extending tongues or vice-versa.

The spring guide 3 together with the clip wire 2 and the leg spring 4 produces pretensioning in the installation state shown. In this case, the first end 4.2 of the leg spring 4 presses against the lower face of the region of the second clip section 2.2 on the angled-back side. The second end 4.4 of the leg spring is fixed in the eccentric plate 3.2, by being inserted therein in the longitudinal direction.

An upward deformation of the second clip section 2.2 is prevented in this installation state by the bulged portion 2.3 being pressed against the first cam 3.4 and being prevented from moving upwards. As a result, the spring guide 3 is not rotatable relative to the first clip section 2.1 about the longitudinal axis thereof, preferably at least not without overcoming the spring force of the leg spring 4.

The installation state shown is the state in which the spring assembly 1 is preferably delivered for the installation of an unlocking mechanism for a longitudinal adjustment system for a vehicle seat. The notch 2.3.1 arranged on the bulged portion 2.3 prevents an inadvertent axial displacement of the spring guide 3 without a defined additional expenditure of force in the installation state and serves as transport securing means.

The spring guide 3 is longitudinally displaceable on the second clip section 2.2, in particular displaceable in the direction of the angled-back portion of the clip wire 2. With a sufficiently large axial displacement of the spring guide 3 on the second clip section 2.2 the first cam 3.4 is preferably displaced in the direction of the angled-back portion of the clip wire 2 adjacent to the bulged portion 2.3, so that the bulged portion 2.3 is no longer pressed against the first cam 3.4 and is prevented from moving upwards. In this case, the maximum travel of the first cam 3.4 is less than the spacing from the first clip section 2.1 to the side of the second clip section 2.2 which is adjacent to the bulged portion 2.3 and which faces the first clip section 2.1. As a result, after the axial displacement of the spring guide 3 the second clip section 2.2 may be moved at least partially upwardly, following the pretensioning force of the leg spring 4, wherein the pretensioning force of the leg spring 4 is partially, preferably only slightly, dissipated.

Figure 6A:
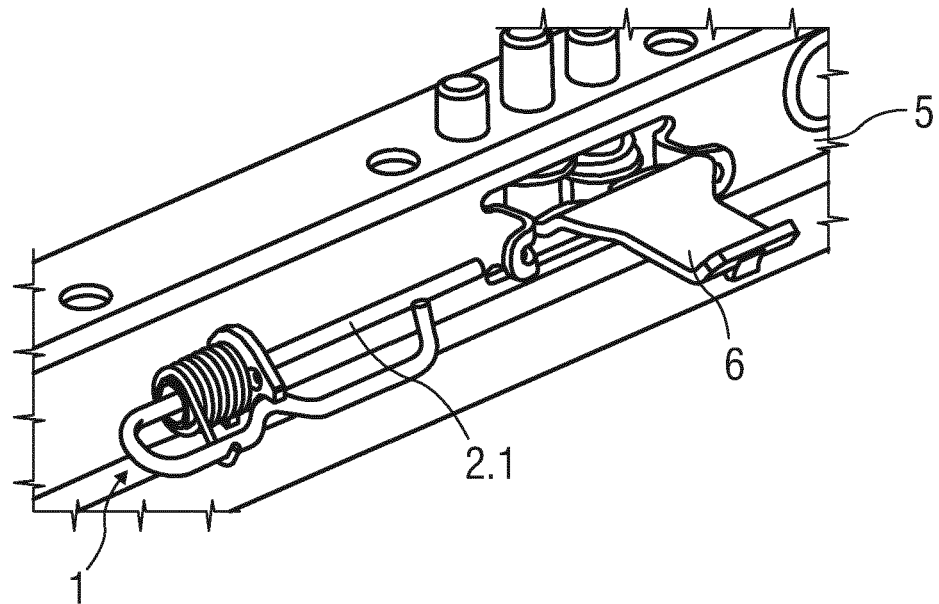
FIG. 6A is a perspective view showing a perspective view of a first installation step for installing the first embodiment of the spring assembly.
Figure 6B:
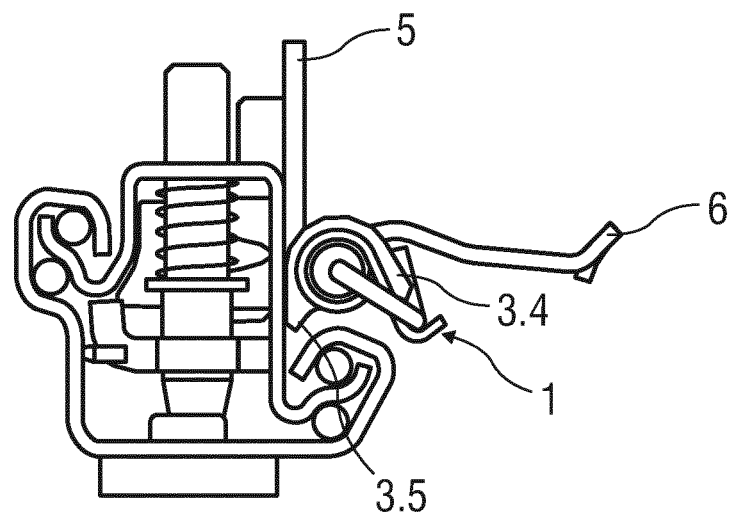
FIG. 6B is a sectional view associated with what is shown in FIG. 6A.

FIG. 6A and FIG. 6B show a perspective view of a first installation step for installing the first embodiment of the spring assembly 1 and/or an associated sectional view. The spring assembly 1 is intended to be installed on an upper seat rail 5 of a vehicle seat, not shown. The upper seat rail 5 comprises an unlocking lever 6, which is known per se, a seat lock being released during the downward actuation thereof. To this end, the spring assembly 1 is intended to be fitted in order to permit a spring force, which has to be overcome for the unlocking, to act on the unlocking lever 6.

In the installation state shown, the spring assembly 1 as described above is still pretensioned, the bulged portion 2.3 is thus still retained by the first cam 3.4. The spring assembly 1 is not yet moved into the final fitted position.

Figure 7A:
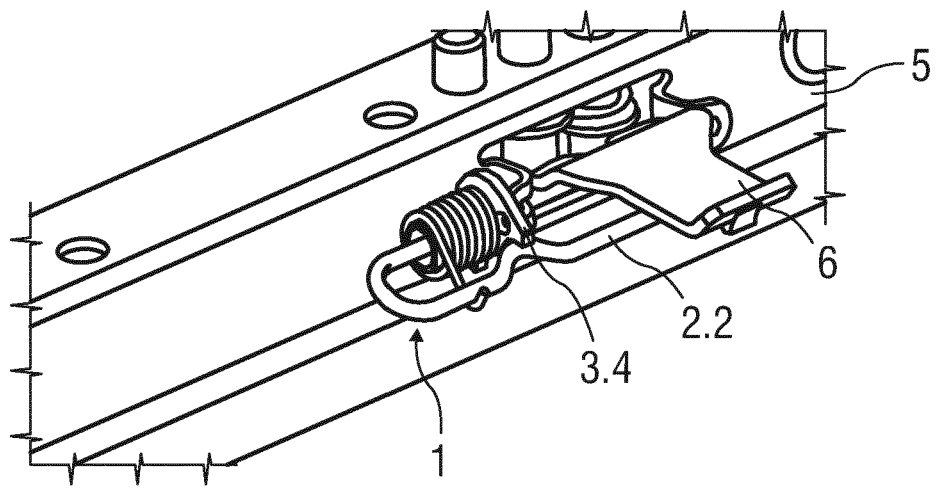
FIG. 7A is a perspective view showing a second installation step for installing the first embodiment of the spring assembly.
Figure 7B:
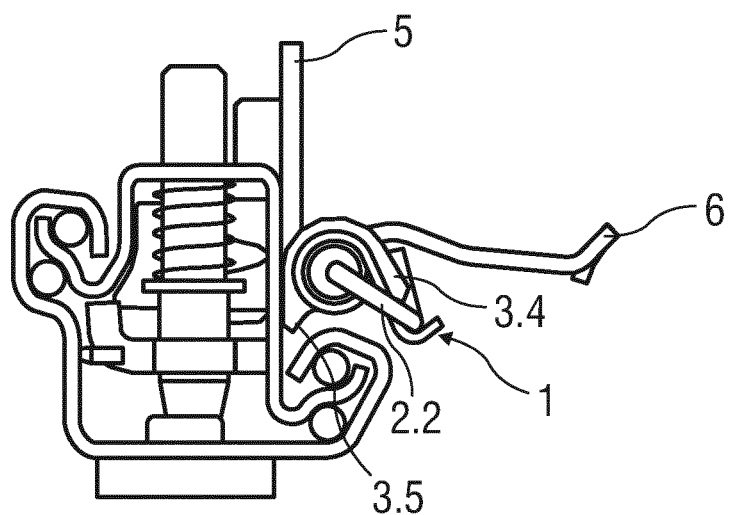
FIG. 7B is a sectional view associated with what is shown in FIG. 7A.

FIG. 7A and FIG. 7B show a perspective view of a second installation step for installing the first embodiment of the spring assembly 1 and/or an associated sectional view.

The spring assembly 1 is already displaced further in the longitudinal direction, wherein the spring guide 3 with the leg spring 4 has already reached the final fitted position. The spring assembly 1, however, is still in the above-described installation state. In other words, the bulged portion 2.3 is still retained by the first cam 3.4. The second cam 3.5 already bears against the vertical outer wall of the upper seat rail 5. The spring assembly 1 is still untensioned relative to the unlocking lever 6. The clip section 2.1 serves in the installation state as a pivot pin for the unlocking lever 6.

Figure 8A:
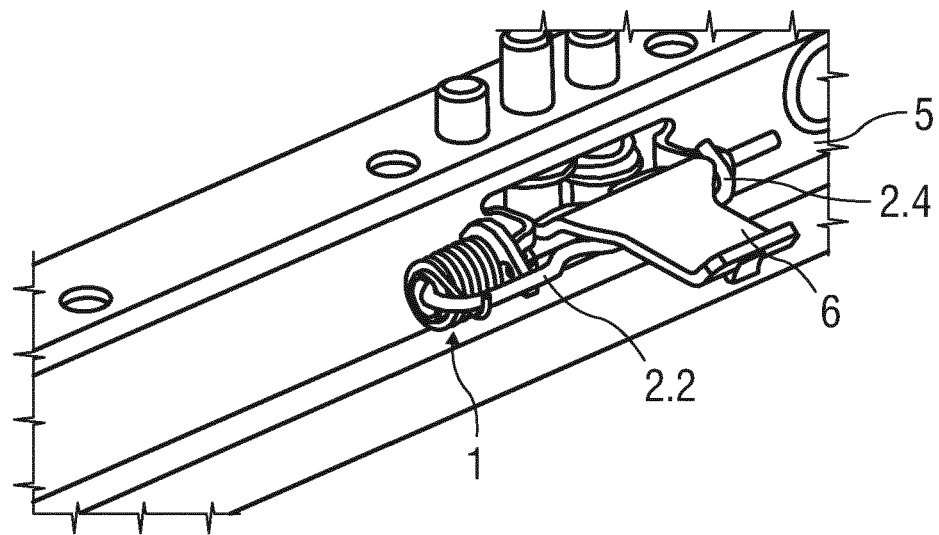
FIG. 8A is a perspective view showing a third installation step for installing the first embodiment of the spring assembly.
Figure 8B:
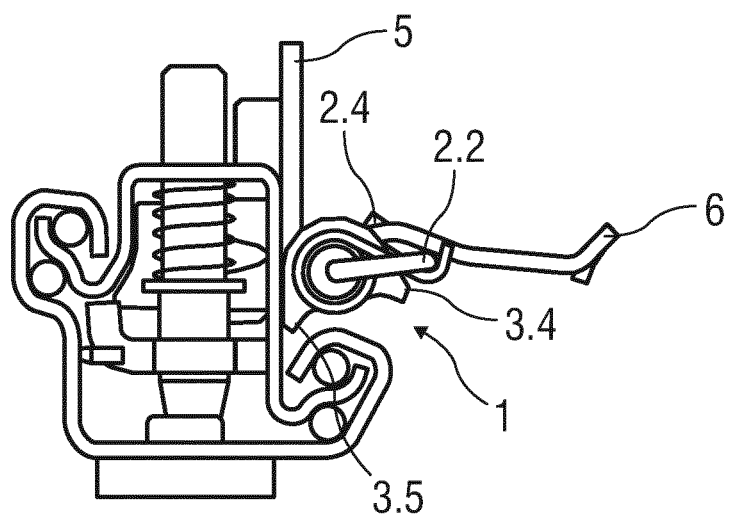
FIG. 8B is a sectional view associated with what is shown in FIG. 8A.
Figure 9A:
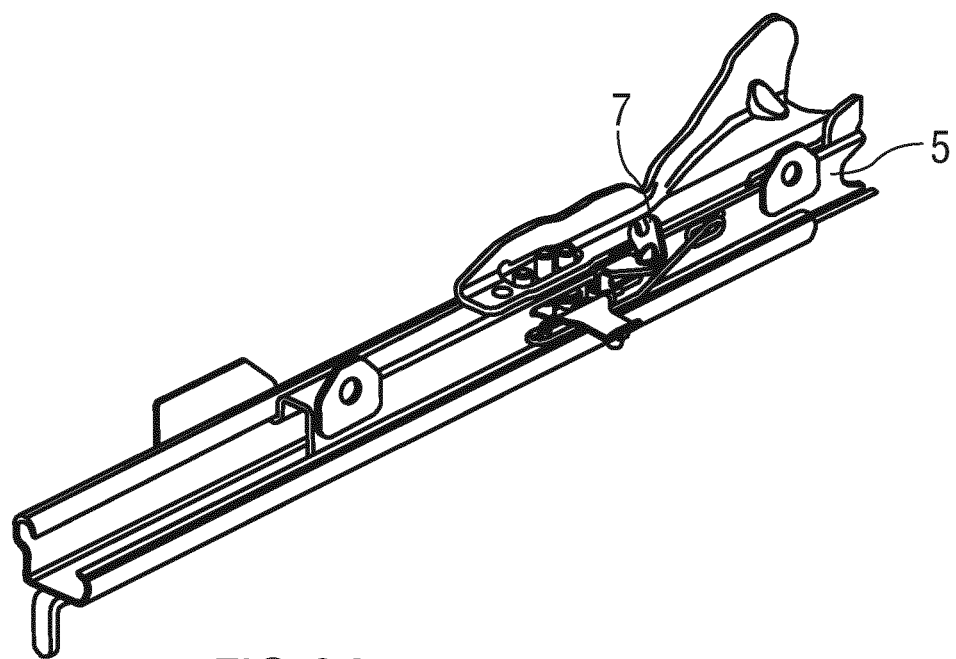
FIG. 9A is a perspective view showing a first embodiment of a longitudinal adjustment of a vehicle seat with a lower and an upper seat rail.
Figure 9B:
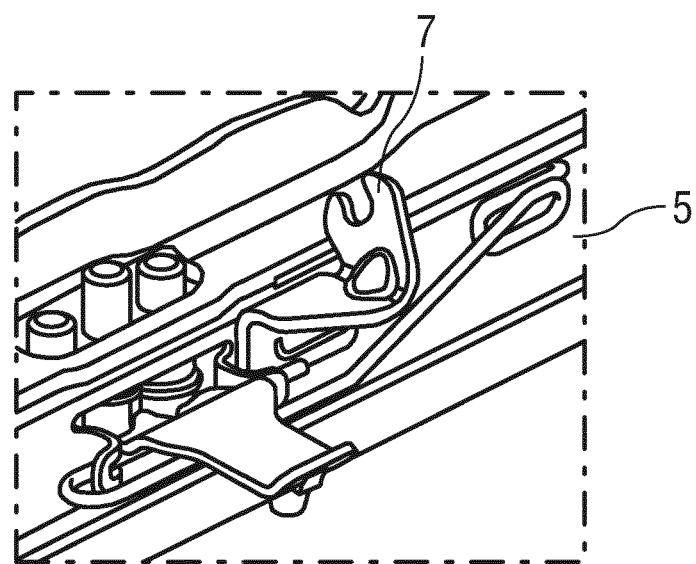
FIG. 9B is a perspective view showing an associated enlarged detailed view of the first embodiment of a longitudinal adjustment of a vehicle seat with a lower and an upper seat rail.
Figure 9C:
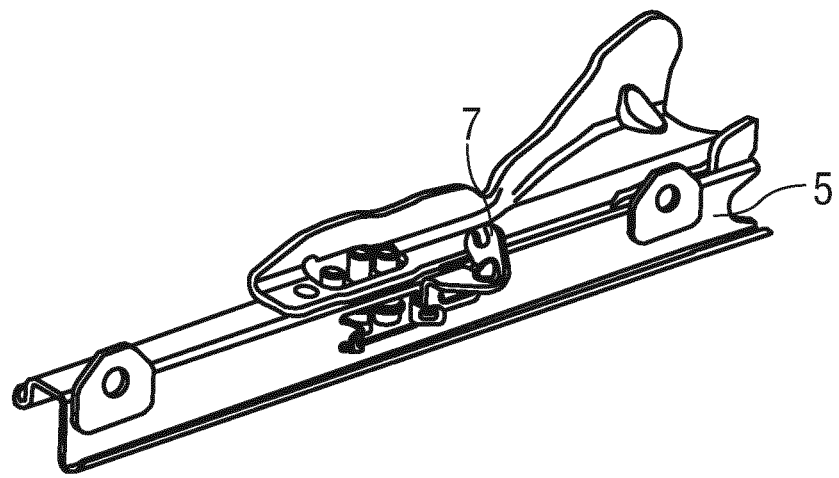
FIG. 9C is a perspective view associated with what is shown in FIG. 9B.
Figure 9D:
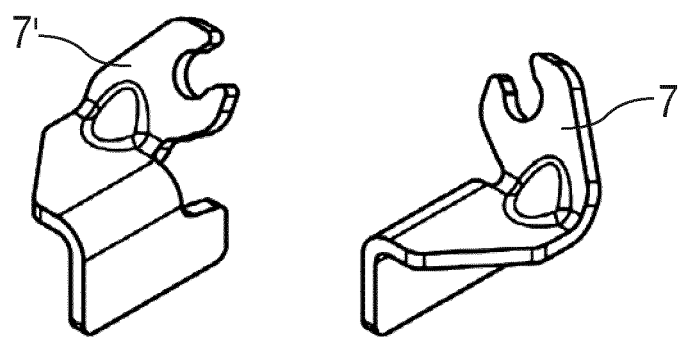
FIG. 9D is an enlarged detailed view associated with what is shown in FIG. 9C.

FIG. 8A and FIG. 8B show a perspective view of a third installation step for installing the first embodiment of the spring assembly 1 and/or an associated sectional view.

The spring assembly 1 is already moved into its final fitted position. The spring assembly 1 is no longer in the above-described installation state. The clip wire 2 has been axially displaced in the spring guide 3, so that the bulged portion 2.3 is no longer retained by the first cam 3.4. As a result, the second clip section 2.2 bears from below against the unlocking lever 6, whereby this unlocking lever is pressed upwardly. The second cam 3.5 also bears against the vertical outer wall of the upper seat rail 5 and is thus pressed thereagainst.

The installation position of the spring assembly 1 has thus been deactivated during the installation thereof by displacing the clip wire 2, so that for actuating the unlocking lever 6 downwardly, a spring force which is predetermined by the spring assembly 1 now has to be overcome.

The clip hook 2.4 is arranged such that in the operating state, i.e. after installation, the spring assembly 1 is now prevented from being pulled out.

FIGS. 9A to 9D show a perspective view of a first embodiment of a longitudinal adjustment system for a vehicle seat with a lower and an upper seat rail 5. A holder 7 for receiving a Bowden cable is arranged on the upper seat rail 5. Moreover, a corresponding holder 7' is shown, said holder being able to be arranged or being arranged on a second upper seat rail, not shown here.

Figure 10A:
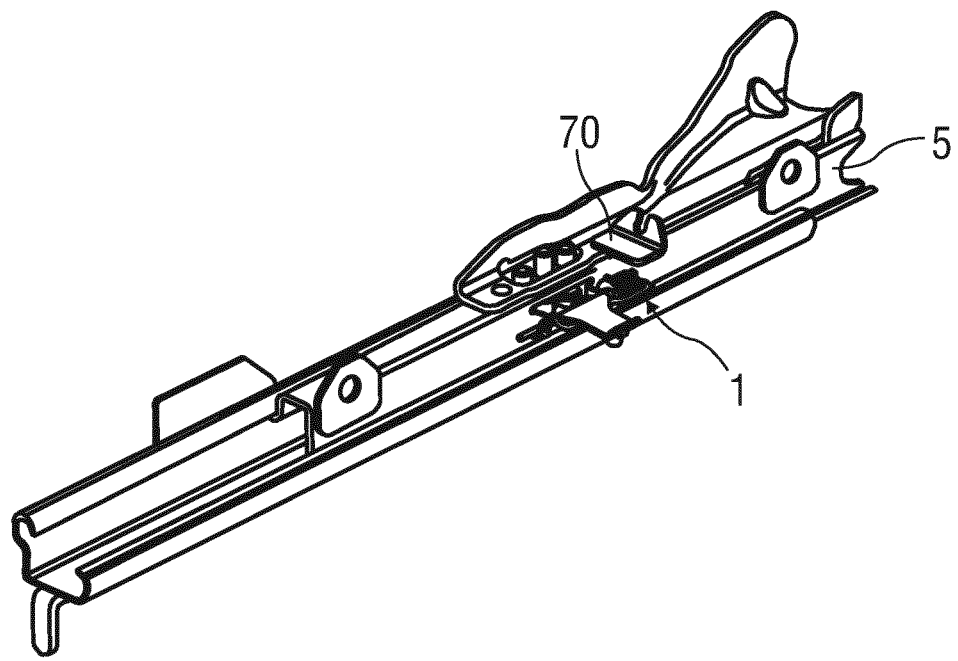
FIG. 10A is a perspective view showing a second embodiment of a longitudinal adjustment system for a vehicle seat with a lower and an upper seat rail.
Figure 10B:
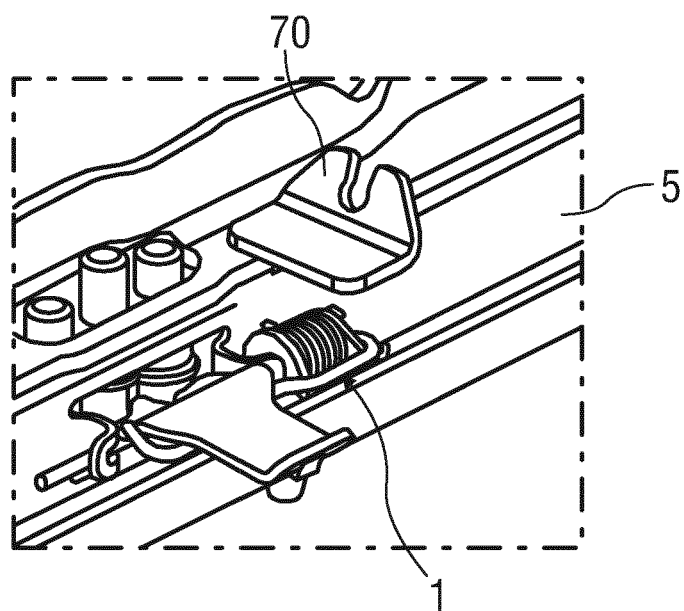
FIG. 10B is an enlarged detailed view associated with what is shown in FIG. 10B.
Figure 10C:
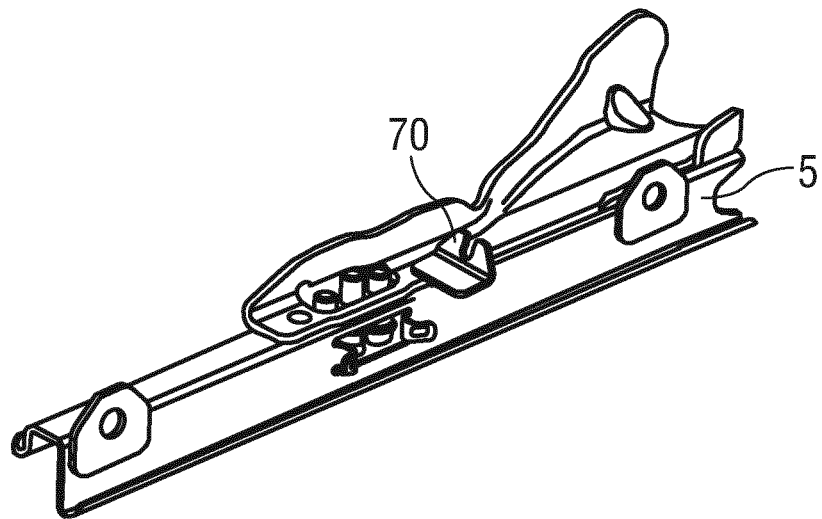
FIG. 10C is a perspective view associated with what is shown in FIG. 10B.
Figure 10D:
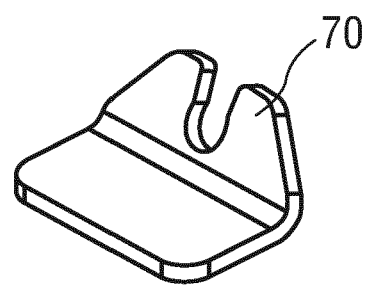
FIG. 10D is an enlarged detailed view associated with what is shown in FIG. 10C.

FIGS. 10A to 10D show a perspective view of a second embodiment of a longitudinal adjustment system of a vehicle seat with a lower and an upper seat rail 5. A holder 70 for receiving a Bowden cable is arranged on the upper seat rail 5. FIGS. 10A and 10B also show a spring assembly 1, FIG. 10D shows the holder 70 alone.

Figure 11A:
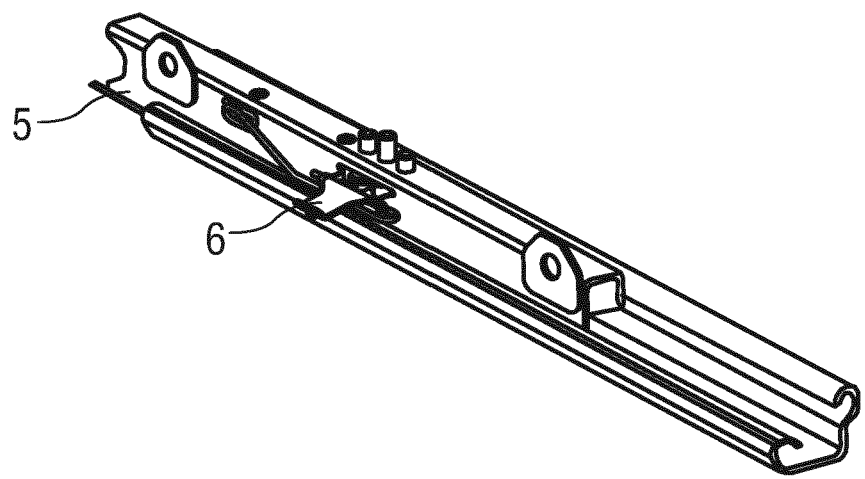
FIG. 11A is a perspective view of an embodiment of a longitudinal adjustment system for a vehicle seat with a lower and an upper seat rail.
Figure 11B:
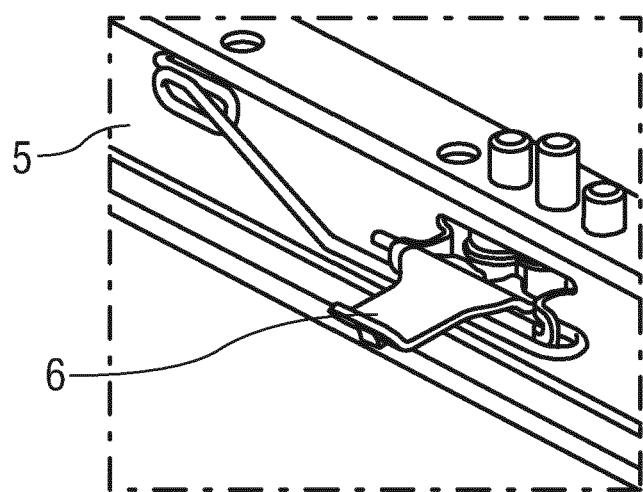
FIG. 11B is a perspective view showing an associated enlarged detailed view.

FIG. 11A and FIG. 11B show a perspective view of an embodiment of a longitudinal adjustment system for a vehicle seat with a lower and an upper seat rail 5, an unlocking lever 6 being located thereon.

Figure 12A:
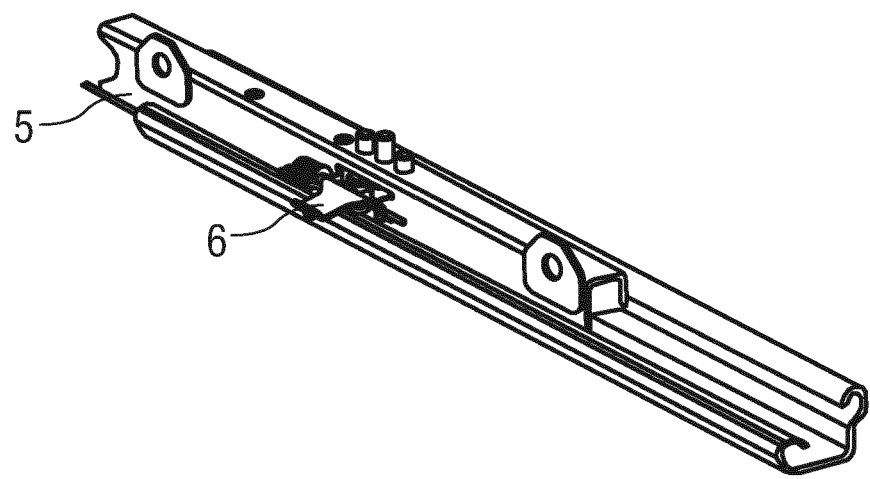
FIG. 12A is a perspective view showing an embodiment of a longitudinal adjustment system of a vehicle seat with a lower and an upper seat rail.
Figure 12B:
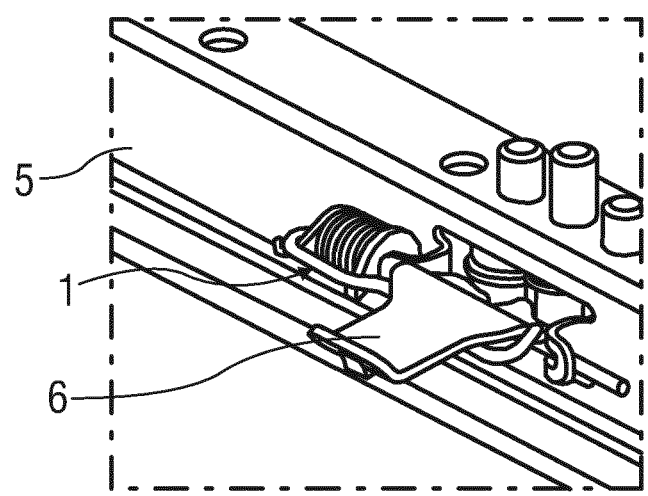
FIG. 12B is an enlarged detailed view associated with what is shown in FIG. 12A.

FIG. 12A and FIG. 12B show a perspective view of an embodiment of a longitudinal adjustment system for a vehicle seat with a lower and an upper seat rail 5, an unlocking lever 6, which is subjected to a spring force by a spring assembly 1, being located thereon.

While specific embodiments of the invention have been shown and described in detail to illustrate the application of the principles of the invention, it will be understood that the invention may be embodied otherwise without departing from such principles.

The invention claimed is:

1. A spring assembly for an unlocking mechanism for a vehicle seat, the spring assembly comprising:
   a clip wire;
   a spring guide; and
   a leg spring,
   wherein in an installation state the spring guide is arrangeable or is arranged axially displaceable and non-rotatable on a straight first clip section of the clip wire, and
   wherein the spring guide is movable or is moved into an operating state in which the spring guide is rotatable with respect to the first clip section via an axial displacement on the first clip section,
   wherein the clip wire has a second clip section which extends substantially parallel to the straight first clip section and which comprises a bulged portion which is aligned relative to the first clip section,
   wherein in the installation state the spring guide together with the clip wire and the leg spring produces a pretensioning, wherein a first end of the leg spring presses against a region of the second clip section on an angled-back side, wherein a second end of the leg spring is fixed in an eccentric plate and wherein the bulged portion presses against a first cam and as a result is prevented from moving.

2. The spring assembly as claimed in claim 1, wherein the spring guide is configured in one piece and comprises a sleeve and the eccentric plate, wherein the eccentric plate comprises the first cam and a second cam as well as an arcuate portion arranged between the cams.

3. The spring assembly as claimed in claim 1, wherein the spring guide is configured as a spring mandrel, wherein the spring assembly is tensioned in the installation state and a spring force is releasable only after the first clip section is displaced relative to the spring guide, wherein during this release the spring guide is rotatable on the first clip section.

4. The spring assembly as claimed in claim 1, wherein in the operating state, after the axial displacement of the clip wire in the spring guide, the first cam is arranged adjacent to the bulged portion, the second clip section bears with a spring force against the lower face of an unlocking lever and a second cam bears against an outer wall of an upper seat rail and is pressed with a spring force thereagainst.

5. A method for installing a spring assembly, in an unlocking mechanism for a vehicle seat, the method comprising the steps of:
   providing a spring assembly comprising:
   a clip wire;
   a spring guide; and
   a leg spring,
   wherein in an installation state the spring guide is arrangeable or is arranged axially displaceable and non-rotatable on a straight first clip section of the clip wire, and the spring guide is movable or is moved into an operating state in which the spring guide is rotatable with respect to the first clip section via an axial displacement on the first clip section;
   tensioning the spring assembly in the installation state and moving the tensioned spring assembly on an upper seat rail below an unlocking lever;
   moving the spring guide by the leg spring into a final position in which a second cam bears against an outer wall of the upper seat rail;
   and subsequent to the step of moving the spring guide, axially displacing the clip wire in the spring guide so that a second clip section bears by spring force against the lower face of the unlocking lever,
   wherein the clip section is used as a pivot pin for the unlocking lever.

6. The method as claimed in claim 5, wherein a clip hook is brought into operative connection with the unlocking lever so that in the operating state the spring assembly is prevented from being pulled out.

7. The method as claimed in claim 5, wherein a first end of the leg spring acts counter to the second clip section and a second end of the leg spring is suspended in a bore of an eccentric plate,
   wherein the spring guide is initially blocked against rotation by contact of the second cam with a bulged portion, and
   wherein subsequently a spring force of the spring guide is released by axial displacement of the spring guide,
   wherein subsequently the spring guide is supported on the wall of the upper seat rail and the second clip section is supported on the unlocking lever.

8. The method as claimed in claim 5, wherein initially via a notch arranged on a bulged portion the spring guide is prevented from being inadvertently axially displaced.

9. A spring assembly for an unlocking mechanism for a vehicle seat, the spring assembly comprising:
   a clip wire;
   a spring guide; and
   a leg spring,
   wherein in an installation state the spring guide is arrangeable or is arranged axially displaceable and non-rotatable on a straight first clip section of the clip wire, and
   wherein the spring guide is movable or is moved into an operating state in which the spring guide is rotatable with respect to the first clip section via an axial displacement on the first clip section,
   wherein the clip wire has a second clip section which extends substantially parallel to the straight first clip section and which comprises a bulged portion which is aligned relative to the first clip section, wherein in the operating state, after the axial displacement of the clip wire in the spring guide, the first cam is arranged adjacent to the bulged portion, the second clip section bears with a spring force against the lower face of an unlocking lever and the second cam bears against an outer wall of an upper seat rail and is pressed with a spring force thereagainst.

\* \* \* \* \*